United States Patent Office 3,778,403
Patented Dec. 11, 1973

3,778,403
ORGANOSOLS OF AZIRIDINYL ALKYL ACRYLATE OR METHACRYLATE ACRYLIC GRAFT POLYMERS
Aloysius N. Walus, Flint, Mich., assignor to E. I. du Pont de Nemours and Company, Wilmington, Del.
No Drawing. Filed Dec. 22, 1970, Ser. No. 100,795
Int. Cl. C08f 45/28, 45/32, 47/20
U.S. Cl. 260—31.4 R                                3 Claims

ABSTRACT OF THE DISCLOSURE

The organosol coating composition consists essentially of a graft copolymer dispersed in an organic liquid. The backbone of the graft copolymer is insoluble in the organic liquid and is of polymerized units of an alkyl methacrylate, an alkyl acrylate, acrylonitrile, methacrylonitrile, styrene or a mixture of these constituents and has grafted into the backbone through an aziridinyl acrylate or methacrylate coupling unit an acrylic side chain that is soluble in the organic liquid. The composition is particularly useful as an exterior coating for automobiles and trucks.

BACKGROUND OF THE INVENTION

This invention relates to an organosol coating composition and in particular to a self-stabilized organosol coating composition of a graft copolymer.

Organosols of copolymers are known as shown by Thompson U.S. Pat. 3,382,297, issued May 7, 1968 and Duell et al. U.S. Pat. 3,383,352, issued May 14, 1968. Organosols of copolymers that utilize a graft copolymer to stabilize the organosol are also known as taught by Schmidle et al. U.S. Pat. 3,232,903, issued Feb. 1, 1966 and Osmond et al. U.S. Pat. 3,317,635, issued May 2, 1967. These compositions form coatings that are good many uses but there is a need today in the automobile and truck manufacturing industry for a self-stabilized organosol coating composition that is easily formulated with conventional plasticizers and pigments and that can be applied by the use of only two spray coats and that forms a finish having excellent physical properties, such as resistance to deterioration from weathering, good gloss, excellent buffability, scratch and mar resistance and resistance to solvent crazing and water spotting.

Coating compositions have been prepared from copolymers prepared with an aziridinyl alkyl acrylate or methacrylate as shown in Ashby et al. U.S. Pat. 3,480,601, issued Nov. 25, 1969, but these compositions are not organosols nor do finishes prepared from these compositions have the physical properties required for exterior finishes an automobiles and trucks. The film-forming graft copolymer of the novel organosol coating composition utilizes aziridinyl acrylate or methacrylate as the coupling unit. The graft copolymer forms an organosol coating composition that is self-stabilized and that can be readily formulated with conventional plasticizers and pigments and provides an exterior automotive or truck finish with the aforementioned physical properties.

SUMMARY OF THE INVENTION

The organosol coating of this invention comprises 5–70% by weight of a film-forming polymer uniformly dispersed in an organic liquid in which the film-forming polymer has a number average molecular weight of about 20,000–200,000 and consists essentially of a graft copolymer having a hard insoluble polymeric backbone segment and a soft soluble polymeric side chain segment; wherein (1) The polymeric backbone segment of the copolymer is insoluble in the organic liquid and has a glass transition temperature of at least 60° C. and comprises about 95–70% by weight of the copolymer and consists essentially of polymerized units selected from the following group: alkyl methacrylate, alkyl acrylate, acrylonitrile, methacrylonitrile, styrene and mixtures thereof wherein the alkyl groups have 1–4 carbon atoms;

(2) The polymer side chain segments of the copolymer are soluble in the organic liquid and have a glass transition temperature below 20° C. and comprises 5–30% by weight of the copolymer and are grafted onto the backbone segment of the copolymer through coupling units that are polymerized into the backbone wherein the coupling unit has the formula

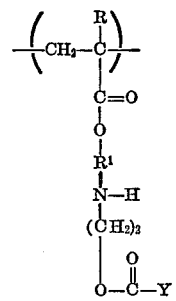

wherein R is either H or —CH$_3$; R$^1$ is an alkylene group having 1–8 carbon atoms; Y is a polymer segment chemically different from the backbone segment and has a molecular weight of about 1,000 to 15,000 and a glass transition temperature of less than 20° C. and consists essentially of polymerized units selected from the following group: an alkyl acrylate, alkyl methacrylate, or a mixture thereof having 2–24 carbon atoms in each of the alkyl groups; the organic liquid comprises a solvent blend containing at least one non-solvent for the graft copolymer backbone segment and at least one solvent for the side chain segment of the copolymer.

DESCRIPTION OF THE INVENTION

The novel coating composition of this invention is an organosol in which 5–70% by weight of a film-forming polymer is uniformly dispersed in an organic liquid. Preferably, the solids content of the organosol composition is 30–60% by weight. By utilizing an organosol composition, coatings can be applied which have a substantially higher polymer solids content and uniform and even coverage can be obtained with the use of only two coats whereas conventional coating compositions, such as lacquers and enamels, require three or more coats to cover the substrate. This has particular cost saving advantages in the automobile and truck manufacturing industry in the reduction of application costs and also have the added advantage of reduction of air pollution since less solvent is utilized in these organosol compositions. Also, non-aromatic solvents that are considered non-air polluting solvents can be utilized in this novel composition.

The graft copolymer utilized in the novel organosol coating composition of this invention is prepared by first forming a prepolymer which is the side chain segment of the copolymer by using conventional polymerization techniques used for the preparation of acrylic polymers. This prepolymer, the backbone monomer units and an aziridinyl compound are reacted to form the graft copolymer. The aziridinyl compound couples the prepolymer to the backbone of the graft copolymer. The resulting copolymer has a number average molecular weight of about 20,000–200,000, preferably copolymers are utilized which have a molecular weight of 30,000–100,000 and preferably, contains 80–92% by weight of the backbone segment and correspondingly, 20–8% by weight of side chain segments.

The prepolymer which forms the side chain of the graft copolymer is prepared by conventional solution polymerization techniques in which the monomer constituents are blended with solvents and a polymerization catalyst and heated to about 75–150° C. for about 2–6 hours to form a polymer of a low molecular weight of about 1,000–15,000.

Typical solvents and diluents which are used to prepare this prepolymer are, for example, toluene, xylene, butyl acetate, acetone, methylisobutyl ketone, methylethyl ketone, butyl alcohol, xylene, hexane, Cellosolve, Cellosolve acetate and other aliphatic, cycloaliphatic, and aromatic hydrocarbons, esters, ethers, ketones and alcohols.

About 0.1–4% by weight, based on the weight of the monomers used to prepare the prepolymer, of a polymerization catalyst is used, such as ditertiary butyl peroxide, cumene hydroperoxide, azo-bis-isobutyronitrile.

One method for preparing a graft copolymer for organosol compositions is to form a prepolymer that contains about 1–30% by weight of an α,β-unsaturated carboxylic acid. The free carboxyl of the prepolymer reacts with the aziridinyl group of the aziridinyl compound and forms a prepolymer with one site of ethylenically unsaturation. This ethylenically unsaturated site of the prepolymer reacts with the ethylenically unsaturated backbone monomer units to form the graft copolymer. Generally, the graft copolymer contains residual unreacted carboxylic acid. The amount of residual acid may be about 0.1–5% by weight, based on the weight of the graft copolymer. Typically useful α,β-ethylenically unsaturated carboxylic acids used to prepare this prepolymer are acrylic acid, methacrylic acid, crotonic acid, ethacrylic acid, itaconic acid and the like. Acrylic acid and methacrylic acid are preferred.

The technique that provides a high quality graft copolymer is to neutralize one of the carboxyl groups of the prepolymer with a basic compound and then react this prepolymer with the aziridinyl compound. The molar ratio of basic compound to carboxyl equivalent of prepolymer to aziridinyl compound is maintained at 1:1:1. Typical basic compounds that can be used volatilize below 100° C. and are, for example, ammonia, ammonium hydroxide, primary amines, secondary amines, tertiary amines and polyamines, such as monoethanolamine, diethanolamine, diethylamine, triethylamine, methyldiethanolamine and the like.

It may be desirable to utilize only one carboxylic group per prepolymer chain, neutralize this carboxyl group with a basic compound and then react this prepolymer with an aziridinyl compound to form the graft copolymer. This technique leaves no residual acid in the resulting graft copolymer. This can be accomplished by using azocyanopentenoic acid for preparing the prepolymer without using an ethylenically unsaturated acid constituent which results in a prepolymer terminated with one carboxyl group. The carboxyl group of prepolymer is then neutralized and the prepolymer is reacted as above with the aziridinyl compound and with the backbone monomers to form the graft copolymer.

The graft copolymer is prepared by using the aforementioned polymerization techniques in which the constituents may be further blended with solvents and additional polymerization catalysts are added and the reaction mixture is heated to about 75–150° C. for about 2–6 hours to form the graft copolymer. The aforementioned polymerization catalysts are utilized and any of the aforementioned solvents can also be used to prepare the graft copolymer.

The monomers selected for the prepolymer should provide a prepolymer that is relatively soft and soluble in solvents and that has a glass transition temperature of below 20° C. and as low as −100° C. The alkyl arcylates and methacrylates which are used to form this prepolymer contain 2–24 carbon atoms in the alkyl group and preferably, 2–12 carbon atoms in the alkyl group, are, for example, ethyl acrylate, propyl acrylate, butyl acrylate, hexyl acrylate, 2-ethylhexyl acrylate, lauryl acrylate, stearyl acrylate, ethyl methacrylate, propyl methacrylate, butyl methacrylate, isobutyl methacrylate, hexyl methacrylate, 2-ethylhexyl methacrylate, octyl methacrylate, nonyl methacrylate, lauryl methacrylate, stearyl methacrylate and the like. Up to about 25% by weight, based on the weight of the prepolymer, of methyl methacrylate can be used with the aforementioned monomers provided that the glass transition temperature of the side chain remains below 20° C.

The monomer units selected for the backbone of the graft copolymer should provide a hard backbone segment that is insoluble in many solvents and that has a glass transition temperature of at least 60° C. to about 110° C. Typical monomer units which are used to form the backbone of the polymer are alkyl methacrylates, having 1–4 carbon atoms in the alkyl group, such as methyl methacrylate, propyl methacrylate, butyl methacrylate, acrylonitrile, methacrylonitrile, styrene and mixtures thereof. Small amounts of the aforementioned monomers used for the side chain can be utilized in the backbone segment provided the glass transition temperature of the backbone segment does not decrease below 60° C. The backbone segment of the graft copolymer must be chemically different from the side chain segment to provide a graft copolymer with soluble side chain segments that can be formed into the novel organosol coating composition of this invention.

Optionally, up to 20% by weight, based on the weight of the backbone of the graft copolymer, of acrylic adhesion promoting units can be added to the hard backbone segment provided that the glass transition temperature of the segment remains within the 60° C. to 110° C. range. Typical adhesion promoting monomers that can be used are aminohydroxy alkyl methacrylates and acrylates, such as aminohydroxy propyl methacrylate, aminohydroxy propyl acrylate, aminohydroxy ethyl methacrylate and the like; aminoalkyl methacrylates or acrylates, such as aminopropyl methacrylate, aminoethyl methacrylate, aminoethyl acrylate; ethylenically polymerizable oxazolidine compounds, such as 3-(2-methacryloxyethyl)-2,2-spirocyclohexyl oxazolidine.

The aziridinyl compound utilized in this invention to form the graft copolymer has the formula

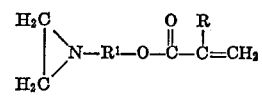

where R is H or —CH₃ and R¹ is an alkylene group having 1–8 carbon atoms. Typical aziridinyl compounds of this type are aziridinyl acrylates or methacrylates, such as 2-(1-aziridinyl) alkyl acrylate, such as 2-(1-aziridinyl) ethyl acrylate, 2-(1-aziridinyl) propyl acrylate, 2-(1-aziridinyl) butyl acrylate, 2-(1-aziridinyl) hexyl acrylate, 2-(1-aziridinyl) octyl acrylate, 2-(1-aziridinyl) ethyl methacrylate, 2-(1-aziridinyl) propyl methacrylate, 2-(1-aziridinyl) butyl methacrylate, 2-(1-aziridinyl) hexyl methacrylate, 2-(1-aziridinyl) octyl methacrylate. One particularly preferred compound is 2-(1-aziridinyl) ethyl methacrylate since it forms graft copolymers of high quality.

Generally, the graft copolymer is prepared by solution polymerization and the resulting graft copolymer solution is converted to an organosol by the addition of a non-solvent for the graft copolymer backbone segment. To form a stable organosol, the non-solvent for the backbone segment must dissolve the side chain segment or the resulting blend of non-solvent and solvent of the solution must dissolve the side chain segment. The graft copolymer particles in the organosol will be from about 0.1 micron to about 2 microns in diameter and will form an organosol that is stable for long periods of time. The organosol can be readily formed into a solution by the addition of proper solvents and the solution can be reversed to form a stable organosol by the addition of suitable nonsolvents.

It may be desirable to directly prepare an organosol in the polymerization process for forming the graft copolymer. This can readily be accomplished by the addition of a non-solvent for the graft copolymer backbone segment during the polymerization process. The resulting product will be an organosol.

Typical solvents for the graft copolymer that can be used in the polymerization process and in the final organosol composition are, for example, methylethyl ketone, methylisobutyl ketone, Cellosolve, methyl Cellosolve, Cellosolve acetate, butyl Cellosolve, butyl Cellosolve acetate, xylene, toluene, diacetone alcohol, ethylene glycol diacetate, butyl carbitol and other aromatic hydrocarbons, ketones, ethers and esters.

Typical non-solvents for the graft copolymer backbone but are solvents for the side chain are as follows: aliphatic hydrocarbon solvents, such as hexane, cyclohexane, mineral spirits, heptane, VM & P naphtha, "Isopar E"; aliphatic and cycloaliphatic alcohols having 1–8 carbon atoms, such as methanol, ethanol, propanol, isopropanol, butanol, isobutanol, pentanol, hexanol, cyclohexanol, octanol and the like and blends of the above.

Preferably, about 1–30% by weight, based on the weight of the film-forming constituents of a plasticizer can also be used in the composition, such as butylbenzyl phthalate, dibutyl phthalate, triphenyl phosphate, 2-ethylhexylbenzyl phthalate, dicyclohexyl phthalate, neopentyl glycol phthalate, dibenzyl phthalate, butylcyclohexyl phthalate, mixed benzoid acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexylester of hexamethylene diphthalate, di(methylcyclohexyl) phthalate.

Other plasticizers that can be used are epoxidized soya bean oil, oil-free and oil-modified alkyd resins and polyesters, such as polyethylene terephthalate esters, polyalkylene adipate esters, polyarylene adipate esters, polyesters of adipic acid/neopentyl glycol/benzoic acid, coconut oil/phthalic anhydride/ethylene glycol and the like.

Pigments are used in the novel organosol coating composition of this invention in the amounts of 0.1–20.0% by weight of pigment, preferably, 0.3–6.0% by weight of pigment, is used. Preferably, the pigment is formed into a mill base using conventional techniques and then blended with the organosol. Examples of the great variety of pigments which are used in the novel coating composition of this invention are metallic oxides, preferably titanium dioxide, zinc oxide, and the like, metal hydroxides, metal flakes, metal powders, chromates such as lead chromate, sulfides, sulfates, carbonates, carbon black, silica, talc, china clay, lead and iron blues, organic reds, maroons, organic dyes, lakes, etc.

The organosol novel coating compositions of this invention can be applied to a variety of substrates, for example, suitably primed metal substrates, wood, glass, plastics, and the like, by any of the usual application methods, such as spraying, electrostatic spraying, dipping, brushing, flowcoating and the like. These coatings can be air dried but preferably, are baked at about 110–200° C. for about 10–60 minutes. The resulting coating is about 1–5 mils thick, preferably 1–3 mils thick and can be rubbed or polished in accordance with conventional techniques, if desired, to improve smoothness or apparent gloss or both.

Preferably, the novel organosol coating composition of this invention is applied over a suitably primed metal and/or sealed metal substrate. Typical alkyd primers or epoxy primers pigmented with iron oxide, carbon black, titanium dioxide and the like can be used. Preferably, sealers are used over these primers and are, for example, of epoxy/acrylic copolymers as disclosed in Rohrbacher U.S. 3,509,086, issued Apr. 28, 1970.

The organosol coating compositions of this invention are generally applied by spraying and have excellent application properties. To reduce the composition to a spray viscosity, a blend of a solvent for the copolymer and a non-solvent for the backbone of the copolymer is used. The solvent should have a boiling point that is at least 10° C. higher than the boiling point of the non-solvent. After the coating composition is sprayed onto the substrate, it is then baked; the non-solvent evaporates leaving a solution of the graft copolymer on the substrate. The solution has a substantially higher viscosity than does the organosol and sagging of the coating is eliminated. The solvent coalesces the copolymer particles in the baking of the coating and forms a smooth and continuous film. Any of the aforementioned solvents for the graft copolymer and non-solvents for the backbone can be utilized to reduce the organosol coating to a spray viscosity. One preferred composition is a blend of cyclohexane/ethylene glycol/Cellosolve acetate.

The dried coatings of the compositions of this invention are characterized by increased freedom from water spotting, have excellent craze resistance in combination with outstanding durability and weatherability and good gloss retention. Coatings of this invention also have good gasoline resistance and resistance to aromatic solvents.

The organosol coating compositions of this invention find particular utility in coating articles such as in the automobile and truck industry which are mass produced. Also, with the organosol coating compositions of this invention, repairs can be made and the refinished spots blend with adjacent or overlapping areas.

The following examples illustrate this invention. The parts and percentages are by weight unless otherwise specified.

Example 1

| Portion 1: | Parts by weight |
|---|---|
| Xylol | 622.0 |
| Butanol | 70.0 |
| Isopropyl alcohol | 60.0 |
| Portion 2: | |
| Lauryl methacrylate | 600.0 |
| Methacrylic acid | 100.0 |
| Xylene | 215.0 |
| Isopropanol | 35.0 |
| Azo-bis-isobutyronitrile | 10.0 |
| Portion 3: | |
| Lauryl methacrylate | 216.6 |
| Methacrylic acid | 83.4 |
| Cellosolve | 100.0 |
| Azo-bis-isobutyronitrile | 5.0 |
| Portion 4: | |
| Xylene | 100.0 |
| Butanol | 20.0 |
| Azo-bis-isobutyronitrile | 5.0 |
| Portion 5—Azo-bis-isobutyronitrile | 2.0 |
| Total | 2244.0 |

Portion 1 is charged into a polymerization vessel equipped with a reflux condenser and a stirrer. The solvent is heated to its reflux temperature which is about 105°

C. While maintaining the reaction mixture at its reflux temperature, Portion 2 is slowly charged over a 30-minute period. Portion 3 is then slowly charged over a 30-minute period, while maintaining the reaction mixture at its reflux temperature. Portion 4 is divided into 5 equal parts and charged into the reaction mixture at 5-minute intervals. The reaction mixture is held at its reflux temperature for about 1 hour and then Portion 5 is charged into the reaction mixture and the mixture is held at its reflux temperature for an additional 15 minutes.

The resulting prepolymer is of lauryl methacrylate and methacrylic acid in a weight ratio of about 82/18. The polymer has an acid number of 117, and the polymer has a relative viscosity of 1.04 measured at 0.5% polymer solids in ethylene dichloride solvent at 25° C. The solution has a polymer solids content of 43.3% and a Gardner Holdt viscosity at 25° C. of Q.

An organosol of a graft copolymer then is prepared according to the following procedure by polymerizing in solution and precipitating to form an organosol by the addition of an aliphatic hydrocarbon solvent and alcohol mixture.

|  | Parts by weight |
|---|---|
| Portion 1: |  |
| Prepolymer solution prepared above (43.3% polymer solids) | 167.00 |
| Xylene | 170.00 |
| Butanol | 50.00 |
| Cellosolve | 55.00 |
| Hydroquinone | 0.03 |
| Triethylamine | 3.00 |
| Portion 2: |  |
| 2-(1-aziridinyl)ethyl methacrylate | 2.40 |
| Methyl methacrylate | 498.00 |
| Acrylonitrile | 27.60 |
| Portion 3—Acetone | 152.00 |
| Portion 4—Azobisisobutyronitrile | 1.50 |
| Portion 5—Azobisisobutyronitrile | 1.00 |
| Portion 6—Azobisisobutyronitrile | 1.00 |
| Portion 7—Azobisisobutyronitrile | 2.00 |
| Portion 8: |  |
| Aliphatic hydrocarbon solvent V.M. and P-naphtha solvent | 603.00 |
| Butanol | 120.00 |
| Total | 1853.53 |

Portion 1 is charged into a polymerization equipped with a reflux condenser and stirrer and thoroughly mixed. Portion 2 is premixed and charged into the polymerization vessel. The reaction mixture is heated to its reflux temperature, and is held at its reflux temperature for 1½ hours. Portion 3 is charged into the reaction vessel and the temperature is cooled to about 82° C. Portion 4 is then added and the reaction mixture is heated to its reflux temperature and held at this temperature for 1½ hours. Portion 5 is added and the reaction mixture is held at reflux for an addtional hour. Portion 6 is added and the reaction mixture is held at the reflux temperature for 45 minutes and Portion 7 is then added and also held for 45 minutes. Portion 8 is premixed and added while the reaction mixture is being mixed. Portion 8 converts the reaction mixture from a solution to an organosol.

The resulting organosol has a total solids content of 31.1% and a Gardner Holdt viscosity at 25° C. of D. The polymer of the organosol has an acid number of 12.3 and a relative viscosity of 1.199 measured at 0.5% polymer solids in an ethylene dichloride at 25° C.

An organosol lacquer composition is then formulated from the above prepared organosol:

|  | Parts by weight |
|---|---|
| Portion 1—Organosol prepared above (32% polymer solids) | 238 |
| Portion 2: |  |
| Plasticizer (prepared from adipic acid, neopentyl glycol and benzoic acid 60% polymer solids in toluene) | 40 |
| Ethylene glycol diacetate/Cellosolve acetate | 12 |
| Portion 3—Solvent blend cyclohexane/ethylene glycol diacetate/Cellosolve acetate (weight ratio 40/30/30) | 124 |
| Total | 414 |

Portion 2 is premixed and added to Portion 1 in a mixing vessel and then Portion 3 is added to Portions 1 and 2 and the blend is thoroughly mixed. The film is then sprayed onto a metal panel suitably primed and also to a glass panel. The films are baked for 30 minutes at 150° C. The film thickness is about 2 mils. The resulting film has excellent clarity, a Knoop hardness of 12.5 and has good gasoline resistance.

Example 2

In the example, an organosol is prepared directly in the polymerization process:

|  | Parts by weight |
|---|---|
| Portion 1: |  |
| Copolymer of lauryl methacrylate/methacrylic acid, weight ratio about 82/18 (43.3% polymer solids, prepared in Exaple 1) | 167.00 |
| Aliphatic hydrocarbon solvent | 200.00 |
| Butanol | 102.00 |
| Hydroquinone | 0.03 |
| Triethylamine | 3.00 |
| Portion 2: |  |
| 2-(1-aziridinyl)ethyl methacrylate | 2.40 |
| Methyl methacrylate | 498.00 |
| Acrylonitrile | 27.60 |
| Cyclohexane | 200.00 |
| Portion 3—Azobisisobutyronitrile | 1.50 |
| Portion 4—Azobisisobutyronitrile | 1.00 |
| Portion 5—Azobisisobutyronitrile | 1.00 |
| Portion 6—Azobisisobutyronitrile | 1.00 |
| Portion 7—Azobisisobutyronitrile | 2.00 |
| Total | 1206.53 |

Portion 1 is charged into a polymerization vessel equipped with a stirrer and a reflux condenser. Portion 2 is then charged into the reaction vessel and the reaction mixture is heated to its reflux temperature and held at this temperature for 1½ hours. Portion 3 is then added and the temperature is lowered to about 82° C. Portion 4 is then added and the reaction mixture is heated to its reflux temperature and held at this temperature for 1½ hours. Portion 5 is then added and the reaction mixture is held at its reflux temperature for an additional hour. Portion 6 is then added and the reaction mixture is held at its reflux temperature for an additional 45 minutes. Portion 7 is then added and the reaction mixture is held at its reflux temperature for an additional 45 minutes.

The resulting organosol dispersion has a milky white appearance and a total solids content of 51.0% and the polymer has an acid number of 12.4 and a relative viscosity of 1.287 measured at 0.5% polymer solids in ethylene dichloride at 25° C.

An organosol lacquer composition is prepared as in Example 1 using the identical solvents, except the above prepared organosol is substituted for the organosol used in Example 1. The resulting lacquer has the same physical properties as the organosol of Example 1. Films are formed on primed metal panels and on glass panels as in Example 1 and have properties which are similar to those of the lacquer films of Example 1.

Example 3

| Portion 1: | Parts by weight |
|---|---|
| Copolymer solution (prepared in Example 1) | 167.00 |
| Xylene | 200.00 |
| Butanol | 102.00 |
| Hydroquinone | 0.03 |
| Triethylamine | 3.00 |
| Portion 2: | |
| 2-(1-aziridinyl)ethyl methacrylate | 2.40 |
| Methacrylonitrile | 525.60 |
| Portion 3—Cyclohexane | 135.00 |
| Portion 4—Azobisisobutyronitrile | 1.50 |
| Portion 5—Azobisisobutyronitrile | 4.00 |
| Total | 1140.53 |

Portion 1 is charged into a reaction vessel equipped with a stirrer and reflux condenser and thoroughly mixed. Portion 2 is then added and the reaction mixture is heated to its reflux temperature and held at this temperature for 1½ hours. Portion 3 is then added and the temperature of the reaction mixture is reduced to 77° C. Portion 4 is then added and held at its reflux temperature for 1½ hours. Portion 5 is divided into four equal parts and added at 1 hour intervals while maintaining the reaction mixture at its reflux temperature.

The resulting organosol dispersion has a milky white appearance and a total polymer solids of 52.5%. The polymer has an acid number of 12.2 and a relative viscosity of 2.220 measured at 0.5% polymer solids in dimethyl formamide at 25° C. The dispersion was dissolved in dimethyl formamide and a film was cast on a metal substrate and baked for 30 minutes at 150° C. A tough solvent resistant film resulted which can be used as an exterior coating on automobiles and trucks.

Example 4

A prepolymer is prepared by reacting the following ingredients:

| Portion 1: | Parts by weight |
|---|---|
| Xylene | 1100 |
| Butanol | 193 |
| Portion 2: | |
| Lauryl methacrylate | 500 |
| 2-ethylhexylacrylate | 640 |
| Methacrylic acid | 300 |
| Tertiary butyl peracetate solution (75% solids solution in mineral spirits) | 20 |
| Portion 3: | |
| Lauryl methacrylate | 260 |
| 2-ethylhexylacrylate | 160 |
| Methacrylic acid | 140 |
| Tertiary butyl peracetate solution (described above) | 20 |
| Portion 4—Butanol | 302 |
| Portion 5—Xylene | 365 |
| Total | 4000 |

Portion 1 is charged into a polymerization vessel equipped with a stirrer and a reflux condenser, and heated to its reflux temperature which is about 120° C. Portion 2 is then slowly added over a one hour period while maintaining the reaction mixture and its reflux temperature which is about 125° C. Portion 3 is then slowly added over a one hour period while the reaction mixture is maintained at reflux temperature. The reaction mixture is held at reflux temperature for an additional 1½ hours and Portions 4 and 5 are then added.

The resulting polymer has an acid number of 135. The polymer solution has a polymer solids content of 48.8% and a Gardner Holdt viscosity of 25° C. of $Z_1$.

A graft copolymer is then prepared from the above prepolymer composition by reacting the following ingredients:

| Portion 1: | Parts by weight |
|---|---|
| Prepolymer solution prepared above (48.8% solids) | 411.0 |
| Xylene | 50.0 |
| Cellosolve | 100.0 |
| Cellosolve acetate | 217.0 |
| Portion 2—Triethylamine | 10.0 |
| Portion 3: | |
| 2-(1-aziridinyl) ethyl methacrylate | 7.0 |
| Methyl methacrylate | 750.0 |
| Acrylonitrile | 43.0 |
| Portion 4—Acetone | 230.0 |
| Portion 5—Azobisisobutyronitrile | 3.5 |
| Portion 6: | |
| Azobisisobutyronitrile | 1.5 |
| Solvent mixture of V.M. and P-Naphtha/ mineral spirits/isopropyl alcohol (weight ratio of 66/28.4/5.6) | 150.0 |
| Portion 7: | |
| Azobisisobutyronitrile | 1.5 |
| Solvent mixture (described above) | 100.0 |
| Portion 8: | |
| Azobisisobutyronitrile | 1.5 |
| Solvent mixture (described above) | 100.0 |
| Portion 9: | |
| Azobisisobutyronitrile | 1.0 |
| Solvent mixture (described above) | 100.0 |
| Portion 10—Solvent mixture (described above) | 1065.0 |
| Total | 3342.0 |

Portion 1 is charged into a reaction vessel equipped with a stirrer and a reflux condenser. Portion 2 is then added and thoroughly mixed. Portion 3 is added and the reaction mixture is heated to its reflux temperature which is about 105° C. and held at this temperature for 1½ hours. Portion 4 is then added which cools the reaction mixture to about 80° C. Portion 5 is then added and the reaction is held at about 80° C. for about 1 hour. Portion 6 is added and the reaction mixture is held at about 80° C. for an additional hour. Portion 7 is added and the reaction mixture is held at 80° C. for 45 minutes. Portion 8 is then added and the reaction mixture is held at 80° C. for an additional 45 minutes. Portion 9 is then added and the reaction mixture is held at 80° C. for an additional ½ hour. Portion 10 is then added.

The resulting product is an organosol having a polymer solids content of 29.1% and a Gardner Holdt viscosity at 25° C. of about J. The polymer has an acid number of 24.4.

A mill base is prepared by blending the following ingredients:

| Portion 1: | Parts by weight |
|---|---|
| Organosol (prepared above) | 50 |
| Ethylene glycol diacetate | 21 |
| Cellosolve acetate | 15 |
| Xylene | 69 |
| Portion 2: | |
| Titanium dioxide pigment (Rutile pigment) | 347 |
| Xylene | 60 |
| Total | 562 |

Portion 1 is charged into a mixer and is thoroughly blended. Portion 2 is then added and the mixture is thoroughly blended for 30 minutes. The mixture is then charged into a conventional sand mill and ground to a 0.1 mill finess.

An organosol lacquer is prepared by blending the following ingredients:

| | Parts by weight |
|---|---|
| Mill base (prepared above) | 230 |
| Polymer dispersion (prepared above) | 130 |
| V. M. & P-Naphtha | 72 |
| Total | 432 |

This organosol lacquer is diluted to a Zahn cup viscosity of 40 seconds at 25° C. by blending the following ingredients: about 100 parts of the above lacquer are blended with 41 parts of the following solvent blend:

| | Percent |
|---|---|
| Butyl Cellosolve acetate | 54.40 |
| Ethylene glycol diacetate | 8.24 |
| Buthylbenzyl phthalate | 1.09 |
| V. M. & P-Naphtha | 36.27 |

The above diluted organosol lacquer is prayed onto a steel panel primed with a high pigment volume primer surfacer which has been sanded to a smooth surface. The panel is baked at 165° C. for about 30 minutes. The resulting coating is about 2.5 mils thick. The film has an excellent gloss and appearance. A second coat is applied and baked as above. Two coats adequately cover the panel and the resulting panel has an excellent gloss and appearance, excellent solvent resistance, particularly to gasoline, and has excellent water spot resistance and craze resistance. A two coat system of this composition can be utilized as a topcoat for automobiles and trucks.

What is claimed is:

1. An organosol coating composition comprising 5–70% by weight of a self-stabilized film-forming polymer uniformly dispersed in an organic liquid having a particle size of about 0.1–2.0 microns wherein the film-forming polymer has a number average molecular weight of about 20,000–200,000 and consists essentially of a graft copolymer having a hard insoluble polymeric backbone segment and soft soluble polymeric side chain segments; wherein
   (1) the polymeric backbone segment of the copolymer is insoluble in the organic liquid and has a glass transition temperature of about 60° C. to 110° C. and comprises about 95–70% by weight of the copolymer and consists essentially of polymerized units of methyl methacrylate and acrylonitrile; and
   (2) the polymer side chain segments of the copolymer are soluble in the organic liquid and have a glass transition temperature of 20° C. to −100° C. and comprise 5–30% by weight of the copolymer and are grafted onto the backbone segment through coupling units that are polymerized into the backbone wherein the coupling unit has the formula

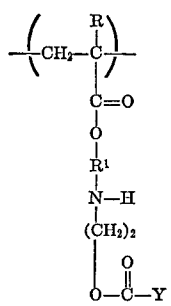

wherein R is $CH_3$; $R^1$ is an alkylene group having 2 carbon atoms; Y is a polymer segment chemically different from the backbone segment having a molecular weight of about 1000 to 15,000 and consists essentially of polymerized unit of lauryl methacrylate and 0–5% by weight, based on the weight of the copolymer, of an ethylenically unsaturated carboxylic acid selected from the group consisting of acrylic acid and methacrylic acid;
   the organic liquid comprises a solvent blend containing at least one non-solvent for the graft copolymer backbone segment and at least one solvent for the side chain segment of the copolymer.

2. An organosol coating composition comprising 5–70% by weight of a self-stabilized film-forming polymer uniformly dispersed in an organic liquid having a particle size of about 0.1–2.0 microns wherein the film-forming polymer has a number average molecular weight of about 20,000–200,000 and consists essentially of a graft copolymer having a hard insoluble polymeric backbone segment and soft soluble polymeric side chain segments; wherein
   (1) the polymeric backbone segment of the copolymer is insoluble in the organic liquid and has a glass transition temperature of about 60° C. to 110° C. and comprises about 95–70% by weight of the copolymer and consists essentially of polymerized units of methacrylonitrile; and
   (2) the polymer side chain segments of the copolymer are soluble in the organic liquid and have a glass transition temperature of 20° C. to −100° C. and comprise 5–30% by weight of the copolymer and are grafted onto the backbone segment through coupling units that are polymerized into the backbone wherein the coupling unit has the formula

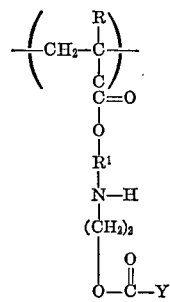

wherein R is $CH_3$; $R^1$ is an alkylene group having 2 carbon atoms; Y is a polymer segment chemically different from the backbone segment having a molecular weight of about 1000 to 15,000 and consists essentially of polymerized units of lauryl methacrylate and 0–5% by weight, based on the weight of the copolymer, of an ethylenically unsaturated carboxylic acid selected from the group consisting of acrylic acid and methacrylic acid;
   the organic liquid comprises a solvent blend containing at least one non-solvent for the graft copolymer backbone segment and at least one solvent for the side chain segment of the copolymer.

3. An organosol coating composition comprising 5–70% by weight of a self-stabilized film-forming polymer uniformly dispersed in an organic liquid having a particle size of about 0.1–2.0 microns wherein the film-forming polymer has a number average molecular weight of about 20,000–200,000 and consists essentially of a graft copolymer having a hard insoluble polymeric backbone segment and soft soluble polymeric side chain segments; wherein
   (1) the polymeric backbone segment of the copolymer is insoluble in the organic liquid and has a glass transition temperature of about 60° C. to 110° C. and comprises about 95–70% by weight of the copolymer and consists essentially of polymerized units of methyl methacrylate and acrylonitrile; and (2) the polymer side chain segments of the copolymer are soluble in the organic liquid and have a glass transition temperature of 20° C. to −100° C. and comprise 5–30% by weight of the copolymer and are grafted onto the backbone segment through coupling units that are polymerized into the backbone wherein the coupling unit has the formula

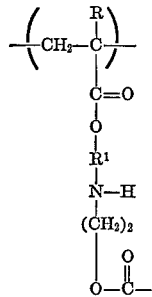

wherein R is $CH_3$; $R^1$ is an alkylene group having 2 carbon atoms; Y is a polymer segment chemically different from the backbone segment having a molecular weight of about 1000 to 15,000 and consists essentially of polymerized units of lauryl methacrylate and 2-ethylhexyl acrylate and 0–5% by weight, based on the weight of the copolymer, of an ethylenically unsaturated carboxylic acid selected from the group consisting of acrylic acid and methacrylic acid; the organic liquid comprises a solvent blend containing at least one non-solvent for the graft copolymer backbone segment and at least one solvent for the side chain segment of the copolymer.

References Cited
UNITED STATES PATENTS

| | | | |
|---|---|---|---|
| 3,317,635 | 4/1967 | Osmond | 260—881 |
| 3,232,903 | 1/1966 | Schindle et al. | 260—33.6 |
| 3,383,352 | 4/1968 | Duell | 260—33.6 |
| 3,480,601 | 11/1969 | Osbey et al. | 260—86.1 |
| 2,915,480 | 1/1959 | Reeves | 260—2 |
| 3,325,443 | 6/1967 | Christenson et al. | 260—41 |
| 3,511,897 | 4/1970 | Endsley | 260—878 |
| 3,382,297 | 4/1968 | Thompson | 260—875 |
| 3,514,500 | 4/1970 | Osmond et al. | 260—874 |
| 3,607,821 | 9/1971 | Clarke et al. | 260—34.2 |
| 3,661,835 | 5/1972 | Baker et al. | 260—34.2 |

ALLAN LIEBERMAN, Primary Examiner

U.S. Cl. X.R.

260—29.1 R, 31.2 R, 32.8 R, 33.2 R, 33.4 R, 33.6 UA, 34.2